Patented June 11, 1940

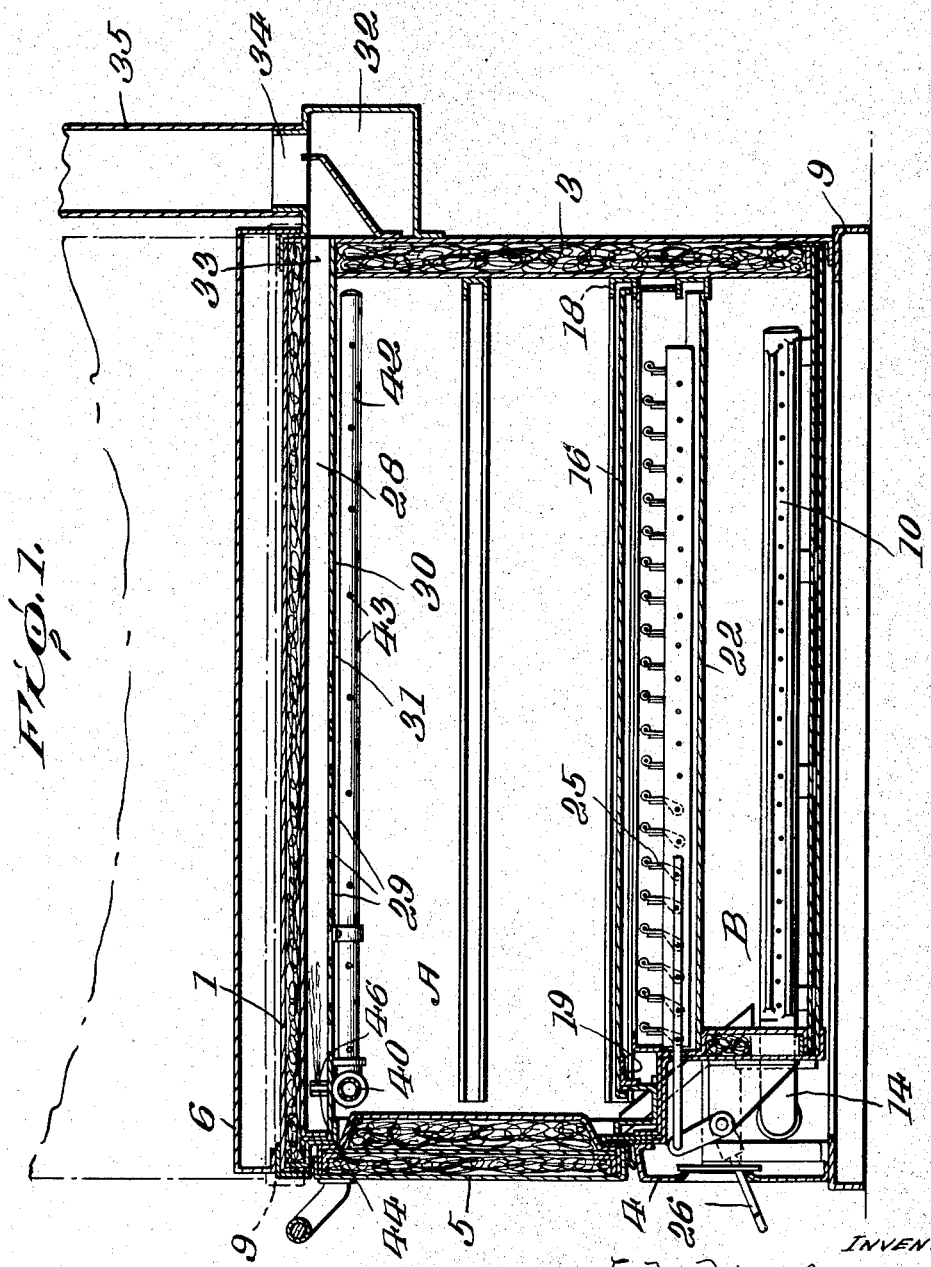

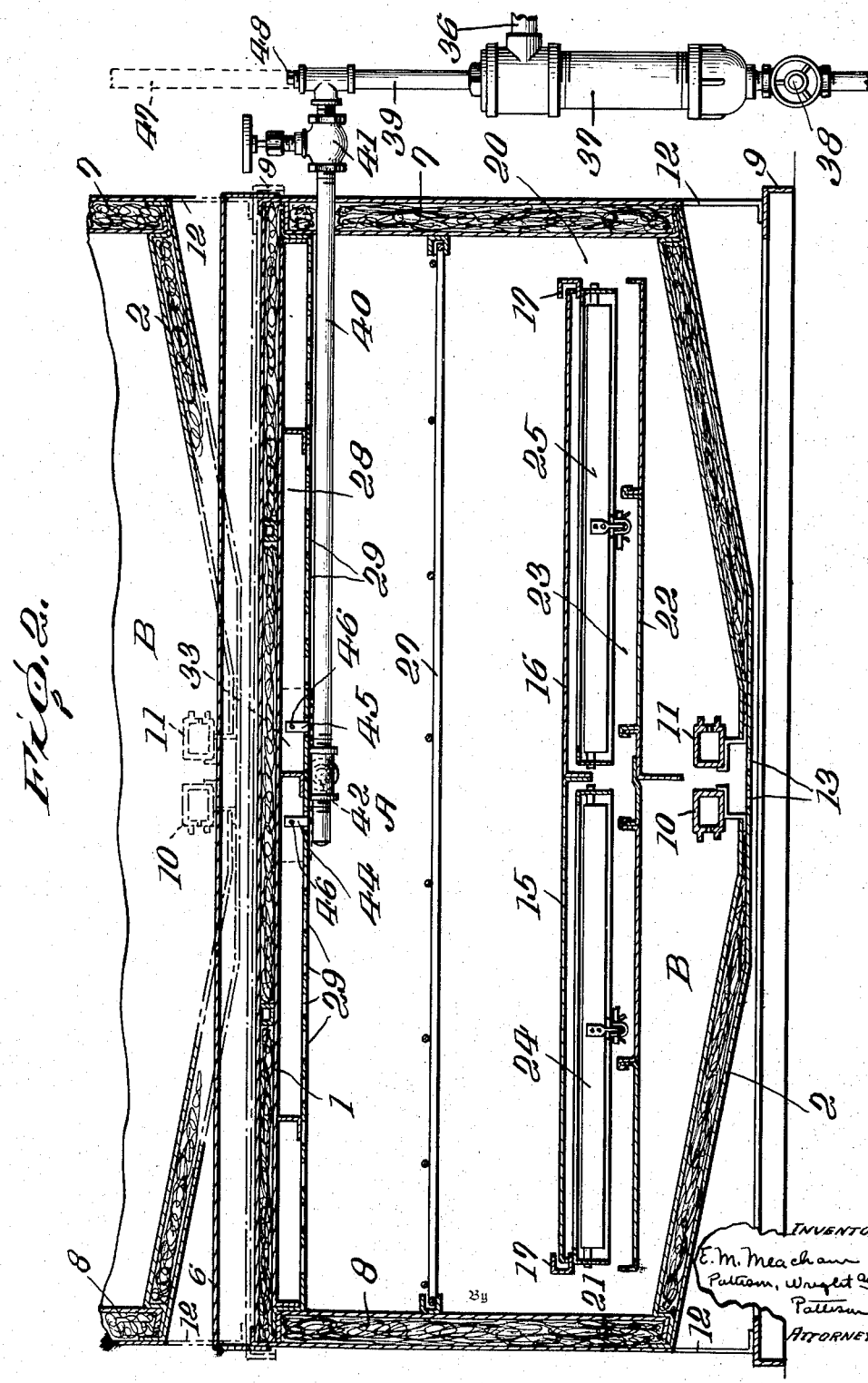

2,204,045

UNITED STATES PATENT OFFICE 2,204,045

BAKING OVEN

Edward M. Meacham, Elyria, Ohio, assignor to American Stove Company, St. Louis, Mo., a corporation of New Jersey Application October 11, 1939, Serial No. 299,016

11 Claims. (Cl. 107—55)

This invention pertains to the introduction or injection of a low pressure moist steam into the baking chamber of a direct fired oven, and although the accompanying drawings illustrate and the following description describes a gas fired or heated oven, it is to be understood that the novel principle and method which I disclose is equally applicable to coal, wood, oil or other fuels as a heating medium for the oven.

To enable the proper baking of hard crust bread and hard crust rolls in an oven it is absolutely essential to introduce into the oven a supply of low pressure moist steam the introduction of which causes the dough to absorb latent heat with the result that the oven development is increased and a golden crust is produced which is not only desirable but is essential to a good product.

So far as I am aware no one has been able successfully or safely to introduce this necessary moist steam into a direct fired oven while the fuel is burning and the successful accomplishment of this result is therefore the primary object of this invention.

Another and further object of the invention is that of simultaneously introducing steam into the oven and into the outlet flue thereof to prevent any detrimental effects such as smothering or completely extinguishing the oven heating element or elements.

Other specific objects such as the particular construction utilized and other specific advantages and improvements of the present invention will appear in more detail from the following description when read in the light of the accompanying drawings.

In the drawings:

Fig. 1 is a vertical sectional view through a direct gas fired baking oven showing the application of the present improved invention thereto.

Fig. 2 is a vertical sectional view taken at right angles to that of Fig. 1.

The introduction of steam into a bake oven for the purpose of properly baking a hard crust on bread, rolls, or the like, is not original with me but has been practiced for many years in indirect fired ovens, but so far as I have been able to determine no one has ever successfully introduced low pressure moist steam into a direct fired oven. It appears that in all prior attempts to introduce steam into a direct fired oven highly detrimental effects on the heating medium or element for the oven have resulted and that these results in many instances have been most dangerous in nature.

In a direct fired oven the products of combustion flow directly through the oven compartment and there is full and complete communication between the combustion chamber, that is to say the chamber or housing within which the heating element is positioned, and the oven compartment itself. Heretofore when steam has been introduced into the oven compartment a pressure has been created which interferes with the travel of the products of combustion to such an extent that the pressure of the steam strikes back or causes the fire to be smothered to a serious degree if not to be completely extinguished. During that time when the fire is being smothered smoke and flue gases are forced out of the fire door when a solid fuel such as coal or wood is being used, and when fuel such as gas or oil is being used as a firing medium combustion is interfered with to such a serious degree as to cause the generation of carbon monoxide gas the escape of which into the atmosphere surrounding the baking oven is highly dangerous. If complete extinguishment of the fire results when gas is being used as a fuel the danger of the escape of this raw and unburned gas will be readily appreciated.

To the end of providing a construction and a method which will enable the introduction of a low pressure moist steam into the baking chamber of a direct fired oven I have conceived a novel manner for the introduction of said steam the nature of which will be immediately hereinafter described in its application to a direct gas fired oven.

Having reference now to the drawings in which is disclosed a direct fired oven of a construction similar to that disclosed in my pending application Serial Number 269,989, A designates a baking oven or chamber and B a burner or combustion chamber arranged in superposed relation within a suitable and preferably fully insulated housing made up of a top 1, a bottom 2, a back 3 and a front composed of a panel 4 and oven door 5. Above the insulated top 1 of the oven there is a false top or panel 6 which may be removed, when occasion requires, as will hereinafter more fully appear. The side walls composing the housing are designated at 7 and 8 respectively in Figure 2 of the drawings.

Ovens for the purpose and of the type described are often arranged in stacks or tiers, that is to say, a plurality of ovens would be arranged in superposed relationship. A pair of ovens so arranged is illustrated in Figure 2 of the drawings and when so utilized it will be apparent that the false panel or plate 6 on the top of the lowermost ovens is removed and that the bottom frame or base 9 of the housing or upper oven rests upon the oven top proper 1.

In the particular embodiment of device here utilized to illustrate the invention a pair of burner arms 10 and 11 are provided within the burner or combustion chamber B and are arranged in separated parallel relationship and extend from front to rear of the chamber and are disposed approximately centrally thereof. The side walls 7 and 8 are cut away as at 12 to permit the passage of secondary air under the oven bottom 2, and between the oven bottom 2 and the top 1 of the adjacent oven when the ovens are stacked, which secondary air passes upwardly through suitable openings 13 provided in the oven bottom intermediate the burner arms 10 and 11. Gas, from any suitable source, is delivered to the burner arms through a suitable manifold pipe 14 and the flow thereof will be under the control of suitable gas cocks (not shown) in accordance with customary practice.

The specific construction of the oven bottom plays no particular part in the present invention. In the drawings the oven bottom is illustrated as being composed of a pair of plates 15 and 16 supported at their sides in suitable channel irons 17. The rear edges or ends of the plates are supported in a channel iron 18 while the front ends thereof are supported on a transversely extending bracket-like channel iron 19. The important constructional feature is that there is direct and unobstructed communication between the oven and the combustion chamber which permits free travel of the products of combustion from the burners and combustion chamber into the baking or oven chamber.

To the accomplishment of this end in the present illustrated device the side edges of the oven bottom stop short of the side walls 7 and 8 of the common housing for the baking and combustion chambers to provide side passageways 20 and 21 which permit heat and products of combustion generated by the burners to flow freely into the baking chamber A.

A means of control of the heat in the bottom of the baking chamber is illustrated. Such a control is desirable but need not follow the construction illustrated. This specific heat control constitutes the invention of the aforementioned copending patent application Serial Number 269,989. Broadly described this heat control constitutes a baffle plate or supplemental oven bottom 22 which is arranged in spaced parallel relationship to the main oven bottom plates 15 and 16. In the space 23 above the baffle 22 a series of louvres 24 and 25 are disposed beneath the oven bottom plates 15 and 16 respectively. At the front of the device, see Figure 1 of the drawings, an operating handle 26 is provided to afford a means by which the louvre sections can be operated or manipulated into any desired position or inclination. The setting of the louvres will control the amount of heat transmitted directly through the oven bottom plates 15 and 16.

Within the oven a rack 27 is provided as is conventional in baking ovens now in common usage.

An outlet flue 28 for the oven or baking chamber is provided and preferably extends over the entire area of the chamber. Communication between the outlet flue 28 and the baking chamber is had through a series of inlet openings 29 which openings are arranged in rows in the flue bottom 30. These rows of openings start at the front of the baking chamber and terminate about midway the depth of said chamber. Preferably the rows of openings graduate as to length to the rear of the baking chamber with the result that the number of openings in each row are reduced as the rows are shortened. The rearmost inlet opening 31 would be a single opening and constitute the entire row.

At its rear the housing is provided with an outlet flue box 32 with which the outlet flue is in free communication as indicated at 33. The flue box 32 is provided with an outlet in the form of a collared opening 34 which telescopically receives the lower end of a flue or stack pipe 35 the upper end of which, when the ovens are in stacked relationship, would be in communication with a similar flue box 32 carried by the next adjacent oven housing.

Steam from any suitable source (not shown) is led by a pipe 36 to a condensation trap 37 which can be drained by a valve 38. A pipe 39 paralleling one of the outer side walls of the oven housing is connected with a conduit 40 through a steam flow control valve 41. The conduit 40 extends into the baking chamber from one side thereof and across the top of the front end of the chamber and terminates at a point approximately above the center of the chamber. To this conduit is connected a second conduit 42 which extends rearwardly along the under side of the flue bottom 30 and is provided periodically throughout its length with outlet openings or orifices 43 to permit the discharge of steam into the baking chamber. The conduit 40 is additionally connected with a pair of steam outlet jets 44 and 45 the outlet openings 46 of which are disposed within the baking chamber outlet flue 28. These outlet orifices face rearwardly in said flue so that the steam escaping therefrom is directed towards the outlet 33 of the flue with the result that when steam is admitted into the baking chamber it is simultaneously admitted into the outlet flue. The flue jets 44 and 45 by reason of their being directed towards the outlet 33 of the flue accelerate the draft within the flue.

When ovens are stacked or arranged in tiers a continuation 47 of the condenser outlet pipe 39 is provided and is attached to that pipe by removal of the plug 48. The pipe 47 will be connected to and deliver steam to a similar piping and jet arrangement which will be provided in the one or more ovens which are superimposed on the lowermost oven.

In operation in the baking of articles which are to have a hard crust the oven is preheated to the desired temperature. The drain valve of the condenser is operated to drain off any accumulated water and steam is then delivered to the condenser and delivered simultaneously into the baking chamber and the chamber outlet flue. During this operation the burners 10 and 11 are burning and the combustion of the burners will not be interfered with by reason of the fact that steam admitted into the outlet flue accelerates the draft therein to an extent that will prevent smothering or any other ill effects to maintaining proper combustion at the burners. The acceleration of draft in the flue is sufficient to prevent the building up of a back pressure which stifles or smothers the movement of products of combustion from the burners and from the combustion chamber into the baking chamber but is not sufficient to draw the steam out of the baking chamber before it accomplishes the desired result of condensing moisture on the surface of the articles therein being baked. When the baking chamber is filled with low pressure moist steam the oven is loaded. After loading the oven the steam is left on for the desired and necessary period of time and thereafter is turned off and the balance of the baking operation is accomplished in the usual and well known manner. Throughout the entire period the baking chamber heating burners have been in operation.

It is highly desirable to be able to turn the steam into the baking chamber while maintaining the burners in constant operation. By being able to operate in this manner not only is time saved but a satisfactory product is assured. Should the burners be extinguished during the steaming period the baking chamber temperature would drop too low to get satisfactory results during the baking period. Furthermore my method and apparatus assures that the desired oven temperature is maintained during the steaming period, which is not the case when the heating burners are extinguished.

Attention is directed to the further fact that due to the simultaneous admission of steam into the baking chamber and the outlet flue thereof the draft within the flue is automatically increased or decreased as the volume of steam released into the baking chamber is increased or decreased thus in this respect making the device automatic.

In the absence of the provision of the automatic acceleration of draft within the baking chamber outlet flue in accord with the volume of steam released or discharged into the baking chamber the steam or vapor discharged into the baking chamber would not escape therefrom fast enough and consequently would produce a back pressure in the combustion chamber which would prevent the products of combustion from moving away from the burner flames with the result that the flames would be smothered out. The steam outlet jets in the outlet flue produce a partial vacuum in the flue which accelerates the flue draft to the extent necessary to overcome any back pressure in the combustion chamber or on the burners. The outlet openings 43 in the baking chamber steam conduit 42 satisfactorily distributes steam throughout the chamber without in any way interfering with the entry into the chamber of flue gas or products of combustion from the combustion chamber.

In ordinary practice the steam is left turned on to discharge into the baking chamber for a period of at least six minutes and this time period is much more than sufficient, in the absence of my apparatus, to build up back pressure which would smother the burner flames if not entirely extinguish them. The detrimental results of a smothered flame irrespective of whether it be a flame burned from a solid or a liquid fuel will be obvious to those familiar with this art. Consequently my apparatus and method is highly desirable in use with solid fuel burners and is vitally essential to liquid fuel burners.

Insofar as I am aware the introduction of steam for baking purposes into the baking chamber of a direct fired oven has never been successfully accomplished and inasmuch as a direct fired oven is much more efficient and by far the most popular type of oven the present apparatus and method constitutes a valuable contribution to the baking art.

I claim:

1. A baking oven comprising, a direct fired baking chamber, an outlet flue for said chamber, means to deliver steam simultaneously into the baking chamber and into said flue, and the steam admitted into said flue being directed towards the outlet thereof to accelerate the flue draft.

2. A baking oven comprising, a direct fired baking chamber, a liquid burner for heating said chamber by the generation of heat and products of combustion which pass freely into said chamber, an outlet flue for said chamber, means to deliver steam simultaneously into the baking chamber and into the outlet flue thereof, and the steam admitted into said flue being directed towards the outlet thereof to accelerate the flue draft.

3. A baking oven comprising, a baking chamber, a combustion chamber having free communication with the baking chamber and provided with a burner for generating heat and products of combustion which pass into said baking chamber, an outlet flue for said baking chamber, means to simultaneously deliver steam into said baking chamber and into said outlet flue, and the steam admitted into said outlet flue accelerating the draft thereof whereby said burner can be operated during the period of admission of said steam into the baking chamber.

4. A baking oven comprising, a baking chamber and a combustion chamber having communication with one another, a burner in the combustion chamber, an outlet flue for the baking chamber, a conduit for admitting steam into the baking chamber, jets for injecting steam into said outlet flue, said jets being directed towards the outlet end of said flue, and means to simultaneously deliver steam to said conduit and said jets, for the purpose described.

5. A construction such as defined in claim 4, wherein means is provided for simultaneously controlling the amount of steam delivered to said conduit and to said jets, whereby said jets accelerate the flue draft in accordance with the amount of steam delivered into the baking chamber.

6. A baking oven comprising, a baking chamber and a combustion chamber having communication therewith, a liquid fuel burner in the combustion chamber, an outlet flue for the baking chamber, and means to simultaneously deliver steam into the baking chamber and into said flue, the steam admitted into said flue acting to accelerate the draft thereof.

7. A baking oven comprising, a baking chamber and a combustion chamber having communication therewith, a burner in the combustion chamber, an outlet flue having communication with the baking chamber, means to simultaneously deliver steam into the baking chamber and into the outlet flue, and the steam admitted into the outlet flue being admitted at a point adjacent the communication thereof with the baking chamber and being directed toward the outlet end of the flue.

8. The method of baking bread or the like which consists of placing the dough to be baked in a direct fired baking chamber having an outlet flue, operating said fire to heat said chamber, and while said fire is in operation simultaneously discharging steam into the baking chamber and into the outlet flue to accelerate the draft in said flue to prevent detrimental effects upon the combustion of said fire.

9. The method of baking bread or the like which consists in placing the dough to be baked in a baking chamber having an outlet flue and having communication with a combustion chamber having a burner therein, operating said burner to attain the desired temperature within said baking chamber, while said burner is in operation injecting steam simultaneously into the baking chamber and into the outlet flue thereof, and directing the steam injected into said outlet flue towards the outlet end thereof to accelerate the draft in said flue.

10. An improved baking device comprising, a pair of independent housings in superposed relationship, each housing provided with a baking chamber and a combustion chamber having communication therewith, a burner in each combustion chamber, an outlet flue for each baking chamber, a steam supply common to both housings, and means in connection with each housing for simultaneously delivering steam into the baking chamber and outlet flue thereof.

11. A baking oven comprising, a baking chamber and a combustion chamber having communication therewith, a burner in the burner chamber, an outlet flue for the baking chamber, a conduit having connection with a suitable source of steam supply, means to deliver steam from said conduit and source of supply into said baking chamber, and means to utilize steam from said source of supply for accelerating the draft within said outlet flue.

EDWARD M. MEACHAM.